United States Patent Office 3,203,859
Patented Aug. 31, 1965

3,203,859
NEMATOCIDAL COMPOSITIONS AND METHOD
Kathel B. Kerr, Charles City, Iowa, assignor to Dr. Salsbury's Laboratories, a corporation of Iowa
No Drawing. Filed Mar. 23, 1964, Ser. No. 354,122
9 Claims. (Cl. 167—53)

This application is a continuation-in-part of my copending application Ser. No. 166,723, filed February 7, 1962, now abandoned.

The invention relates to improvements in the veterinary arts and more specifically to the chemotherapeutic treatment of livestock and fowl for the removal of roundworms which invade the digestive tract of the animals and thereby impair the growth, well-being and disease-resistance of the afflicted hosts.

One of the most tenacious and unmanageable worm infections, particularly in poultry, is caused by a nematode of thread- or hairlike formation known as *Capillaria obsignata*. Serious outbreaks of this infection have been encountered especially in the New England States and in New York and Pennsylvania. Similar attacks have been reported from the Gulf States, Oregon and Washington. The life-cycle of the parasite requires no intermediate host for its completion. In its primary stage, the worm germinates within about one week from its unsegmented egg into a fully developed embryo which is released after it is swallowed by the animal. The larvae enter the mucous membrane of the duodenum to complete their maturation at which stage the presence of eggs can be ascertained in the fecal discharge.

The first third of the chicken intestine is the area primarily invaded by the worm. At autopsy of an infected bird from a poultry operation, the primary finding is an extensive enteritis of the small intestine, particularly the upper third. This condition is usually seen after the chickens start laying eggs, and such chickens either fail to come into egg production or their egg production capacity is significantly reduced. Thus the primary effect of this infection in modern poultry operations is that of impairing productivity resulting in a serious economic loss to the operator. Heavy infestations also increase the susceptibility of the birds to manifold bacterial, viral and protozoan infections and may entail a ruinous rate of mortality.

Another prevalent roundworm in poultry is *Ascaridia galli* which is a parasite large in size and of yellowish white color. Infective transmission results from ingestion of the eggs by susceptible birds. The eggs hatch either in the duodenum or in the glandular stomach of the host and the larvae thereupon invade the mucosa. The afflicted animals suffer from hemorrhage, glandular atrophy, retarded growth and a weakened resistance to other diseases. Droopiness, emaciation and watery droppings are the visible clinical symptoms accompanying the infiltration of the parasite.

As previously mentioned, hair-worm infections are so intractable that their eradication has until now remained a puzzling and troublesome problem of the poultry industry. Apart from sanitary practices and measures of prophylactic management which have their definite limitations in respect of effectiveness and cost, attempts have been made to control the condition with the help of chemicals, such as flowers of sulphur, barium antimonyl tartrate, piperazine, phenothiazine and nicotine. While the efficacy of these drugs is inadequate, the toxicity of others is so high that it falls within the range of their therapeutic potency. A more recent suggestion advocates the use of massive doses of vitamin A as a treatment; it has proved, however, of no consistent remedial value.

I have discovered that a certain group of halogenated tertiary amines is capable of removing the threadworm *Capillaria obsignata* from so infected birds with a surprising degree of regularity and efficacy without undesirable adverse effects upon the metabolic stability and physiological functions of the treated animals. I have also found that the anthelmintic remedies of the present invention are of equally outstanding value in expelling the large nematode *Ascaridia galli* from fowl without untoward reactions. Since birds are susceptible to mixed worm infections and, on the other hand, a highly specific and sensitive relationship exists between the chemical structure of a drug and the physiological properties of a parasite in its host environment, the availability of one single type of medicament for eradicating a multiple nematode invasion significantly enhances its usefulness and value.

It is therefore one object of the present invention to provide novel anthelmintic compositions for the removal of *Capillaria obsignata* and *Ascaridia galli* from poultry and other animals which are highly effective and easily administered.

It is a second object of the present invention to devise a new method of curative treatment for poultry and other animals infected with large and capillary roundworms without exposing the hosts to undesirable side-effects.

Yet another object of this invention is the provision of concentrate mixtures or premixes especially adapted for the facile preparation of the aforementioned nematocidal compositions.

Other objects and advantages and features will become apparent from the following disclosure intended to illustrate the invention without, however, thereby limiting the scope of the same.

The active ingredients forming the essential components of my novel nematocidal compositions can be best represented by the following chemical configuration:

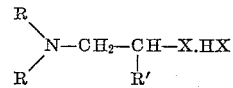

wherein R may be a methyl-, ethyl-, isopropyl-, or butyl radical, R' stands for hydrogen or lower alkyl, and X is selected from the group consisting of chlorine and bromine. In accordance with the foregoing structure my new anthelmintic remedies may also be designated as N-substituted amino-2-haloethane hydrogen halides in which the substituents of the amino group may have the values of R above set forth, while the haloethane group may carry a lower alkyl radical. The R radicals may be either identical or of different configuration without substantially affecting the therapeutic properties of the compounds, as the same seem to be related to the presence of the 2-haloethyl moiety in the tertiary amine.

For the purposes of illustration the following compounds are listed as representative members of my newly discovered series of nematocidal remedies:

$(CH_3)_2=N-CH_2-CH(CH_3)Cl.HCl$ 1-dimethylamino-2-chloropropane HCl $(C_4H_9)_2=N-CH_2-CH_2Cl.HCl$ 1-di-n-butylamino-2-chloroethane HCl $(CH_3)_2=N-CH_2-CH_2Cl.HCl$ 1-dimethylamino-2-chloroethane HCl

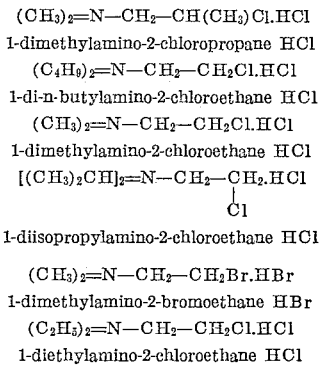

1-diisopropylamino-2-chloroethane HCl $(CH_3)_2=N-CH_2-CH_2Br.HBr$ 1-dimethylamino-2-bromoethane HBr $(C_2H_5)_2=N-CH_2-CH_2Cl.HCl$ 1-diethylamino-2-chloroethane HCl The tertiary amine halide hydrohalides (or their salts) within the scope of this invention are white, crystalline solids of hygroscopic nature with melting points ranging from 105° to 211° C. They are ordinarily soluble in polar media such as water and alcohol and are insoluble in the more non-polar solvents. They react rapidly with bases liberating the free amines. The compounds can be prepared by conventional methods from the corresponding amino alcohol with thionyl halide or hydrogen halide as the halogenating agent. Thus, for instance, 1-dimethylamino-2-chloropropane is formed by heating beta-dimethylamino isopropyl alcohol with thionylchloride, while the treatment of beta-di-ethylamino ethyl alcohol with the same chlorinating agent in chloroform at a temperature of −5° C. yields 1-diethylamino-2-chloroethane. Correspondingly, the synthesis of 1-dimethylamino-2-bromoethane is carried out by treating beta-dimethylaminoethyl alcohol with hydrogen bromide, and the 1-dimenthylamino-2-chloroethane results from heating beta-dimethylamino ethyl alcohol and concentrated hydrochloric acid for 12 hours at 170° C. to 180° C. The tertiary amines thus formed are readily converted into their hydrogen halides by the addition of the corresponding acids.

In order to accomplish the objectives of the present invention, the foregoing compounds are administered orally to the animals in critical dosages so as to produce the desired anthelmintic effect. This can be achieved by dispensation of any liquid or solid non-toxic, ingestible and palatable vehicle in which the drugs are uniformly and homogeneously dispersed. Conveniently, one mode of administration consists in incorporating the active ingredients into feed rations in such amounts as will provide a daily minimum intake thereof to develop the therapeutic action. Rations suitable for this type of medication comprise such elements of sustenance as ground corn, corn meal, dried distiller's grain, citrus meal, ordinary grain, mash, scratch and any other normal or commercial rations. Such rations may or may not be fortified with vitamins, minerals and tonic or growth-promotion factors, and they may also contain additional substances effective in the cure and/or control of other diseases such as chemotherapeutic and antibiotic agents compatible with the anthelmintic compounds of this invention. The so medicated rations are placed before the birds for consumption ad libitum for specified periods of times which may vary with the character of the compound applied and the dosage level employed and can be easily determined by a skilled veterinarian. My novel nematocides may also be used as active ingredients in liquid compositions which can be conveniently prepared by homogeneously dissolving or suspending the same in drinking water. The suspension of compounds with low water solubility can be facilitated by the use of skim milk, edible oils, syrups, or non-toxic and palatable synthetic emulsifiers, dispersants or wetting agents such as sodium-lauryl sulfate, polyoxylene lauryl ether and Emulcol H 72 which is a condensation product of a fatty acid with a polyhydric alcohol.

The effective dosages for most favorable results lie within an over-all range of 0.0075% to 0.2% depending upon the specific compound selected for the treatment. They may also vary with the age, weight and breed of the afflicted animal, the type of worm infection and the vehicle of administration in which the drug is dispensed. The only criterium is that the active ingredient constitute a proportion of the medicated carrier that will provide an adequate dose for the animal consuming it when allowed to feed ad libitum on its medicated diet. This can be determined without difficulty by any skilled worker in the art who is familiar with the pathology of helminthic infections.

It has thus been found, for instance, that 1-dimethylamino-2-bromoethane hydrobromide, when given to a 7-week-old white Leghorn (weighing about 2 lbs. and consuming 0.179 lb. of feed per day), for 4 days in a feed concentration of 0.0075%, corresponding to a daily intake of as little as 6.7 mg./kg. body weight, was 99% effective in the removal of *Capillaria obsignata*. For equivalent results, the daily requirements of 1-dimethylamino-2-chloroethane hydrochloride call for close to 60 mg. per kg. body weight for the elimination of *Ascaridia galli* when administered in a feed concentration of 0.1% to 10–12 week old birds for 1 to 4 days. The minimum intake for 50–60% removal is about 45 mg. per kg. body weight, and for 90–100% efficacy 75 to 130 mg. per kg. body weight for the treatment of hairworm infections in 7 to 10 week old animals under similar conditions. When dispensed in water, the dosages may be lowered to about 0.025% to 0.05%.

The following tables are representative of some of my preferred embodiments of the present invention.

In my studies on *Capillaria obsignata*, 16 White Leghorn chickens, about 7 to 10 weeks old, weighing approximately 1½ to 2½ pounds, were divided into 2 groups of 8 birds each and individually caged. Both groups were artificially inoculated with 70 to 100 eggs which had been embryonated for about three weeks to mature into infective condition. Since it requires about three weeks for the nematode to develop, no testing was performed on any infections within less than one month following inoculation. After the infection had been found to be firmly established, one of the groups was placed on medication under specified conditions, while the other remained untreated and served as control. Two days after the completion of the treatment all the birds were killed to ascertain the comparative number of worms present in each group. For the purposes of post mortem examination the intestine from the gizzard to the vestige of the yolk stalk was removed, split and washed free of food material. The intestine was thereupon cut into strips of 3 to 4 inches in length, dropped into 1000 ml of 1% HCl solution and stirred on a Magne-Stir for about 15 minutes. After the removal of the intestinal strips the solution was poured into funnels with test tubes attached to their stems. The contents of the tubes were permitted to settle for one hour and thereupon transferred into petri dishes for microscopic examination and worm count. The number of parasites found in the untreated group was taken as the probable extent of the artificial inoculation. The number of worms remaining in the medicated group subtracted from the number of worms found in the controls indicates the extent of removal. This difference divided by the amount of worms determined in the controls and multiplied by 100 defines the degree of efficacy in terms of percentages. Thus, if the average worm count in the control is 134 per bird and only 3 parasites per bird were detected in the treated group, the extent of removal is 131, and the efficacy is $$\frac{131}{134} \times 100 = 98\%$$

In the subjoining Table I the first column lists the compound utilized in each experiment. It is followed by the type of vehicle in which the drug was dispensed. Next is listed the dosage level which is expressed both in terms of percentages of concentration by weight of the carrier medium and as an aboslute amount of drug intake per bird/kg. body weight when administered for a specified period as given in column 4. The next column records the number of worms expelled from the medicated birds, followed by a listing of the number of parasites found in the controls. Finally, in the last column is entered the percentage of efficacy resulting from the computation of the two preceding data as hereabove set forth.

Table I.—Capillaria obsignata

| Compound | Vehicle | Dosage Conc., percent | Dosage Mg./Kg. B.W. | Days | Medicated birds, No. removals | Controls, No. found | Efficacy, percent |
|---|---|---|---|---|---|---|---|
| 1-dimethylamino-2-chloropropane HCl | feed | 0.100 | 293 | 4 | 143 | 172 | 83 |
| 1-di-n-butylamino-2-chloroethane HCl | do | 0.100 | 235 | 4 | 327 | 377 | 88 |
|  | do | 0.200 | 716 | 4 | 202 | 312 | 65 |
| 1-dimethylamino-2-chloroethane HCl | do | 0.100 | 516 | 4 | 421 | 421 | 100 |
|  | do | 0.100 | 117 | 1 | 147 | 280 | 53 |
|  | do | 0.100 | 253 | 2 | 274 | 280 | 98 |
|  | do | 0.200 | 170 | 1 | 194 | 213 | 91 |
|  | do | 0.100 | 227 | 3 | 112 | 123 | 91 |
|  | do | 0.100 | 97 | 2 | 44 | 104 | 57 |
|  | Water | 0.050 | 171 | 4 | 108 | 212 | 51 |
|  | Feed | 0.010 | 22 | 4 | 43 | 117 | 37 |
| 1-diisopropylamino-2-chloroethane HCl | do | 0.100 | 47 | 1 | 251 | 305 | 82 |
|  | do | 0.100 | 80 | 2 | 129 | 160 | 81 |
|  | do | 0.100 | 210 | 4 | 136 | 160 | 85 |
|  | Water | 0.200 | 24 | 2 | 142 | 202 | 70 |
| 1-dimethylamino-2-bromoethane HBr | Feed | 0.0075 | 28 | 4 | 142 | 143 | 99 |
|  | do | 0.100 | 153 | 3 | 131 | 134 | 98 |
|  | do | 0.050 | 50 | 2 | 194 | 202 | 96 |
|  | do | 0.050 | 112 | 4 | 201 | 202 | 99 |
|  | do | 0.010 | 37 | 2 | 71 | 77 | 92 |
|  | do | 0.010 | 62 | 3 | 77 | 77 | 100 |
|  | do | 0.010 | 65 | 4 | 186 | 187 | 100 |
|  | do | 0.050 | 117 | 4 | 186 | 187 | 100 |
|  | do | 0.010 | 34 | 4 | 256 | 281 | 91 |
|  | do | 0.010 | 37 | 4 | 235 | 236 | 100 |
| 1-diethylamino-2-chloroethane HCl | do | 0.100 | 197 | 3 | 154 | 305 | 50 |
|  | do | 0.100 | 291 | 4 | 81 | 87 | 92 |
|  | do | 0.200 | 233 | 2 | 86 | 110 | 78 |
|  | do | 0.100 | 241 | 4 | 188 | 192 | 98 |

Table II shows the efficacy of my anthelmintic compositions against *Ascaridia galli*. Experimental infection was carried out by placing a given quantity of embryonated ova in a small amount of feed which would be consumed by the birds within one or two hours. The number of eggs varied from 750 to 1500 per bird. The birds so inoculated were about 10 to 12 days old. This nematode requires about 30 days to reach maturity and medication was not given until the infection was complete. Usually the birds had a weight of 2½ to 3½ pounds when treated. In order to establish the degree of efficacy of the test compound, all the droppings passed by the infected animals for at least three days after the end of the medication period were carefully examined for worms and their number recorded. In this manner the number of parasites removed by the treatment was found. When the fecal discharges no longer showed evidence of worm passage, the birds were sacificed and their intestinal tracts were examined for residual worms. The number of the latter added to the number of parasites removed was considered as the total amount present before the treatment was started, and the ratio between the fecal eliminates and the total number of worms multiplied by 100 defined the percentage of efficacy. Thus, in a given test the average number of worms per bird found in the droppings was 25 and 8 parasites were counted in the intestines of the carcasses; the efficacy was therefore $$\frac{25}{33} \times 100 = 76\%$$

The headings of the columns in Table II correspond to those of the preceding Table I, except that the two penultimate columns record the number of removals and the total number of worms, since the comparison in these tests is not based on controls.

Table II.—Ascaridia galli

| Compound | Vehicle | Dosage Conc., Percent | Dosage Mg./Kg. B.W. | Days | Number of Worms Removals | Number of Worms Total | Efficacy, Percent |
|---|---|---|---|---|---|---|---|
| 1-dimethyl-amino-2-chloroethane HCl | Feed | 0.100 | 62 | 1 | 102 | 106 | 96 |
|  | do | 0.100 | 141 | 2 | 210 | 214 | 98 |
|  | do | 0.100 | 215 | 3 | 222 | 223 | 99 |
|  | do | 0.100 | 283 | 4 | 221 | 232 | 95 |
|  | do | 0.100 | 134 | 2 | 117 | 122 | 96 |
|  | Water | 0.050 | 62 | 2 | 96 | 107 | 90 |
|  | do | 0.050 | 146 | 4 | 38 | 38 | 100 |
|  | do | 0.025 | 65 | 2 | 22 | 33 | 67 |
|  | do | 0.025 | 95 | 3 | 59 | 72 | 82 |
|  | do | 0.025 | 138 | 4 | 83 | 89 | 93 |
| 1-dimethylamino-2-chloropropane HCl | Feed | 0.200 | 196 | 2 | 25 | 33 | 76 |
|  | do | 0.200 | 317 | 4 | 14 | 14 | 100 |
|  | do | 0.100 | 112 | 2 | 9 | 12 | 75 |
|  | do | 0.100 | 269 | 4 | 44 | 44 | 100 |
| 1-dimethylamino-2-bromoethane HBr | do | 0.100 | 109 | 2 | 70 | 90 | 78 |
|  | do | 0.100 | 218 | 2 | 118 | 122 | 97 |
| 1-diethylamino-2-chloroethane HCl | do | 0.100 | 132 | 2 | 56 | 99 | 57 |

The preparation of my anthelmintic poultry rations may be carried out by intimately mixing one or more of my active ingredients with an orally ingestible, non-toxic, palatable carrier material as exemplified hereabove in amount of 1 to 95% by weight and introducing a proportionate quantity of this premix into the bulk of a commercial feed ration with thorough stirring and shuffling until a uniform blend of even distribution of the desired concentration level is obtained.

For practical purposes of marketing and to facilitate the handling of the minute amounts of my novel drugs to be incorporated into the ultimate medicated rations it is most desirable and advantageous to prepare a standardized concentrate with a high content of the active ingredient which may be as high as 95% by weight of the composition. To that effect a non-toxic, inert material such as Fuller's earth, talcum, bentonite, ground oyster shells, limestone and diverse clays or edible substances like soybean meal, wheat middlings and corn meal may be selected as the carrier medium. Such stock concentrates are specifically made and adapted for use in dilutions with an alimentary dispensing vehicle so as to compound the medicated rations at the desired dosage level with utmost convenience. The availability of such commercial concentrates, therefore, is indispensable to the feed manufacturer and poultry raiser who ordinarily uses a standardized weight package of premix for each 1,000 lbs. or one ton of commercial feed to produce the medicated composition.

The following examples illustrate some preferred formulations of the concentrates in accordance with my invention:

EXAMPLE 1

A mixture containing

| | Lbs. |
|---|---|
| 1-dimethylamino-2-chloroethane HCl | 50 |
| Bentonite | 50 | was prepared by intimately blending and grinding the components to the proper fineness and blending them in suitable equipment to provide a satisfactory dispersion of the active and inactive constituents. The premix was thereupon batched into 100 packages of 1 lb. each. The content of 4 of these packages was added to and evenly distributed in 1 (short) ton of an all mash ration to produce a medicated nematocidal feed of a strength of 0.1%.

EXAMPLE II

A tablet containing

| | Mg. |
|---|---|
| 1-dimethylamino-2-chloroethane HCl | 190 |
| Inactive ingredients | 810 | is prepared in a conventional manner, the inert diluent being composed of talcum, stearic acid or its salts, gums, lactose, and cornstarch in order to impart to the table the necessary properties of stability, consistency, cohesion, and lubricity. 10 of such tables are incorporated in 1 gallon of water in order to produce a medicated drinking potion of 0.05%.

Having described my novel anthelmintic compositions in the foregoing specification and examples, I wish it to be understood that various changes and modifications may be resorted to in carrying out my invention without departing from the scope and spirit thereof. Specifically, my worm expellants may within the limits of compatibility be used in conjunction with other veterinary remedies, such as coccidiostatics, bacteriostats, antibiotics and synergistic agents. All such variations and equivalent embodiments are intended to be included within the purview of my invention as defined in the following claims:

What I claim is:
1. A veterinary composition effective in the control of nematode infections comprising an animal feed containing a small, but effective non-toxic amount of a compound having the configuration

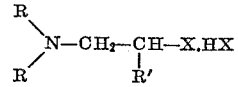

wherein R is a member selected from the group consisting of methyl, ethyl, isopropyl, and butyl, R' is selected from the group of hydrogen and lower alkyl, and X is selected from the group of chlorine and bromine.

2. A veterinary composition in accordance with claim 1 in which the active ingredient is present in an approximate amount of 0.0075 to 0.2%.

3. A veterinary composition in accordance with claim 2 in which the active ingredient is dimethyl-amino-2-chloroethane hydrochloride.

4. A veterinary composition in accordance with claim 2 in which the active ingredient is 1-diisopropylamino-2-chloroethane hydrochloride.

5. A veterinary composition in accordance with claim 2 in which the active ingredient is 1-dimethylamino-2-bromothane hydrobromide.

6. A veterinary composition in accordance with claim 2 in which the active ingredient is 1-diethylamino-2-chloroethane hydrochloride.

7. A veterinary composition in accordance with claim 2 in which the active ingredient is 1-dimethylamino-2-chloropropane hydrochloride.

8. A veterinary composition in accordance with claim 2 in which the active ingredient is 1-di-n-butylamino-2-chloroethane hydrochloride.

9. In the practice of controlling nematode infections in animals which comprises orally administering to animals afflicted with said infections and effective amount of a compound having the formula

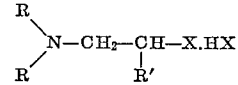

in which R is a member selected from the group consisting of methyl, ethyl, isopropyl, and butyl, R' is selected from the group of hydrogen and lower alkyl, and X is selected from the group of chlorine and bromine.

References Cited by the Examiner

UNITED STATES PATENTS 2,730,440  1/56  Fincke _____ 71—2.7

OTHER REFERENCES

Chem. Abst. (5th Decennial Index), 1946–1956, page 4887S.

Eddy: J. Pharmacol and Exptl. Therapeutics, volume 98, 1950, pages 121 and 127.

Goldin: J. Pharmacol and Exptl. Therapeutics, volume 94, 1948, pages 249–253 and 261.

Hunt: J. Pharmacol and Exptl. Therapeutics, volume 95 (1949), pages 177–180 and 184.

Nickerson: J. Pharmacol and Exptl. Therapeutics, volume 97, September 1949, pages 25, 26, 32 and 33.

Shapiro: Cancer, volume 5, 1949 pages 100–104.

JULIAN S. LEVITT, *Primary Examiner.*

MORRIS O. WOLK, IRVING MARCUS, LEWIS GOTTS, *Examiners.*